US012799763B2

(12) United States Patent
Rollins

(10) Patent No.: US 12,799,763 B2
(45) Date of Patent: Nov. 17, 2026

(54) TANGENT BASE

(71) Applicant: MACLEAN POWER L.L.C., Fort Mill, SC (US)

(72) Inventor: Philip Rollins, Newberry, SC (US)

(73) Assignee: MACLEAN POWER L.L.C., Fort Mill, SC (US)

( * ) Notice: Subject to any disclaimer, the term of this patent is extended or adjusted under 35 U.S.C. 154(b) by 41 days.

(21) Appl. No.: 18/655,314

(22) Filed: May 5, 2024

(65) Prior Publication Data

US 2025/0341111 A1 Nov. 6, 2025

(51) Int. Cl.
*H02G 7/20* (2006.01)
*E04H 12/24* (2006.01)
*F16M 13/02* (2006.01)

(52) U.S. Cl.
CPC ............. *E04H 12/24* (2013.01); *F16M 13/02* (2013.01); *H02G 7/20* (2013.01)

(58) Field of Classification Search
None
See application file for complete search history.

(56) References Cited

U.S. PATENT DOCUMENTS 3,653,622 A * 4/1972 Farmer .................... H02B 5/02 174/45 R
4,015,397 A * 4/1977 Flachbarth ........... H02G 3/0493 248/188.4
4,025,824 A * 5/1977 Cheatham ................ H02B 5/02 174/45 R
4,925,142 A * 5/1990 Farmer ..................... F16B 2/14 403/267
4,932,623 A * 6/1990 Reisdorff ................. H02G 7/20 248/219.3
5,228,260 A * 7/1993 Dziedzic ................. E04H 12/24 403/396
6,347,488 B1 * 2/2002 Koye ...................... E04H 12/24 52/697
6,378,821 B1 * 4/2002 McKelvy ................. H02B 5/02 248/219.4
6,626,406 B1 * 9/2003 Olson, Jr. ................ H02G 7/20 248/219.2
6,862,861 B1 * 3/2005 Lin .......................... H02G 7/20 248/219.3
11,047,147 B2 6/2021 Arlund et al.
2002/0130232 A1 * 9/2002 Herron .................... E04H 12/24 248/219.3
2015/0275504 A1 * 10/2015 Butler ..................... E04H 12/24 52/698
2018/0058628 A1 * 3/2018 Britt, Jr. .................. E04H 12/20
2023/0400123 A1 * 12/2023 Neighbor .............. F16B 31/021
2025/0341111 A1 * 11/2025 Rollins ................... E04H 12/24

* cited by examiner

*Primary Examiner* — Krystal Robinson
(74) *Attorney, Agent, or Firm* — Brooks Kushman P.C.

(57) ABSTRACT

A utility hardware attachment assembly for utility poles is provided. The utility hardware attachment assembly includes a crossarm and a tangent base. A base body of the tangent base has a rear-mounting surface for mounting to the utility pole and a front face opposite the rear-mounting surface. A plurality of tabs extends forward from the front face and form a channel sized for receiving the crossarm. An inner surface of each of the tabs is a generally planar reaction surface. The crossarm is secured to the base body within the channel and the crossarm abuts at least two of the tabs when experiencing an asymmetric load.

20 Claims, 3 Drawing Sheets

TANGENT BASE

TECHNICAL FIELD

The present disclosure generally relates to a mounting base and crossarm used in utility and power transmission systems.

BACKGROUND

Power transmission systems have utility poles traditionally made from wood, steel, or concrete for suspending electrical power lines. Utility crossarms are mounted to the utility pole and extend horizontally and are used in distribution systems to support multiple power lines or other related components and equipment. For example, the crossarm may be secured to a ceramic or polymer insulator that attaches directly to a suspended power line. Crossarms may be secured to the utility pole through a variety of hardware components.

The crossarm is subjected to diverse environmental conditions and operational forces. The crossarm supports the weight of electrical conductors such as power lines or cables as well as the insulators attached to conductors, or other equipment like switches or transformers mounted on the crossarm. These components can add weight and stress to the crossarm, particularly during operation or in the event of a fault. Additionally, the crossarm may also counteract tension and compression forces from the conductors.

Crossarms are exposed to environmental forces such as wind, which can exert significant pressure on them, especially in areas prone to high winds or storms. In colder climates, the crossarm must withstand the added load of ice and snow accumulation. Crossarms may experience other mechanical loads from various sources, including tree branches, animals, or accidental contact from vehicles or machinery.

SUMMARY

According to at least one embodiment, a tangent base for a crossarm is provided. The tangent base has a base body with a rear-mounting surface for mounting to a utility pole and a front face opposite the rear-mounting surface. A plurality of projections extends forward from the front face and form a channel sized for receiving the crossarm.

In another embodiment, an inner surface of each of the projections defines the channel is a generally planar reaction surface to abut the crossarm.

In another embodiment, each of the projections extends forward a projection depth dimension being at least half a crossarm depth.

In another embodiment, the plurality of projections includes at least one pair of tabs spaced apart in a height direction by at least a height dimension of the crossarm. In another embodiment, the tabs have a distal end with a radius curvature. In another embodiment, the at least one pair of tabs is two pair of tabs, the pair of tabs spaced apart in a width direction.

In another embodiment, the two pair of tabs are spaced apart in the width direction by at least twice the depth dimension of the projection.

In another her embodiment, the tangent base includes a plurality of crossarm mounting apertures that extend through from the front face to the rear-mounting surface for securing the crossarm to the tangent base. The crossarm mounting apertures are positioned within the channel.

In another embodiment, the plurality of crossarm mounting apertures comprise a first fastener hole positioned adjacent the first pair of tabs and a second fastener hole positioned adjacent the second pair of tabs.

In another embodiment, the base body is generally symmetric about a central vertical axis extending in a height direction.

In another her embodiment, the tangent base includes a plurality of mounting holes that extend through from the front face to the rear-mounting surface for mounting the base body to the utility pole. The mounting holes are spaced apart from the channel in the height direction.

In another her embodiment, the base body is cast of an aluminum alloy.

According to at least one other embodiment, a utility hardware attachment assembly for utility poles is provided. The utility hardware attachment assembly includes a crossarm and a tangent base. A base body of the tangent base has a rear-mounting surface for mounting to the utility pole and a front face opposite the rear-mounting surface. A plurality of tabs extends forward from the front face and form a channel sized for receiving the crossarm. An inner surface of each of the tabs is a generally planar reaction surface. The crossarm is secured to the base body within the channel and the crossarm abuts at least two of the tabs when experiencing an asymmetric load.

According to at least one other embodiment, a utility hardware attachment assembly for utility poles is provided. The utility hardware attachment assembly includes a crossarm and a tangent base. A base body of the tangent base has a rear-mounting surface for mounting to the utility pole and a front face opposite the rear-mounting surface. A plurality of projections extends forward from the front face to form a channel sized for receiving the crossarm. The crossarm is secured to the base body within the channel.

In another embodiment, the crossarm is formed of fiberglass.

In another embodiment, the crossarm extends from both lateral sides of the base body.

In another embodiment, the crossarm extends from one side of the base body.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
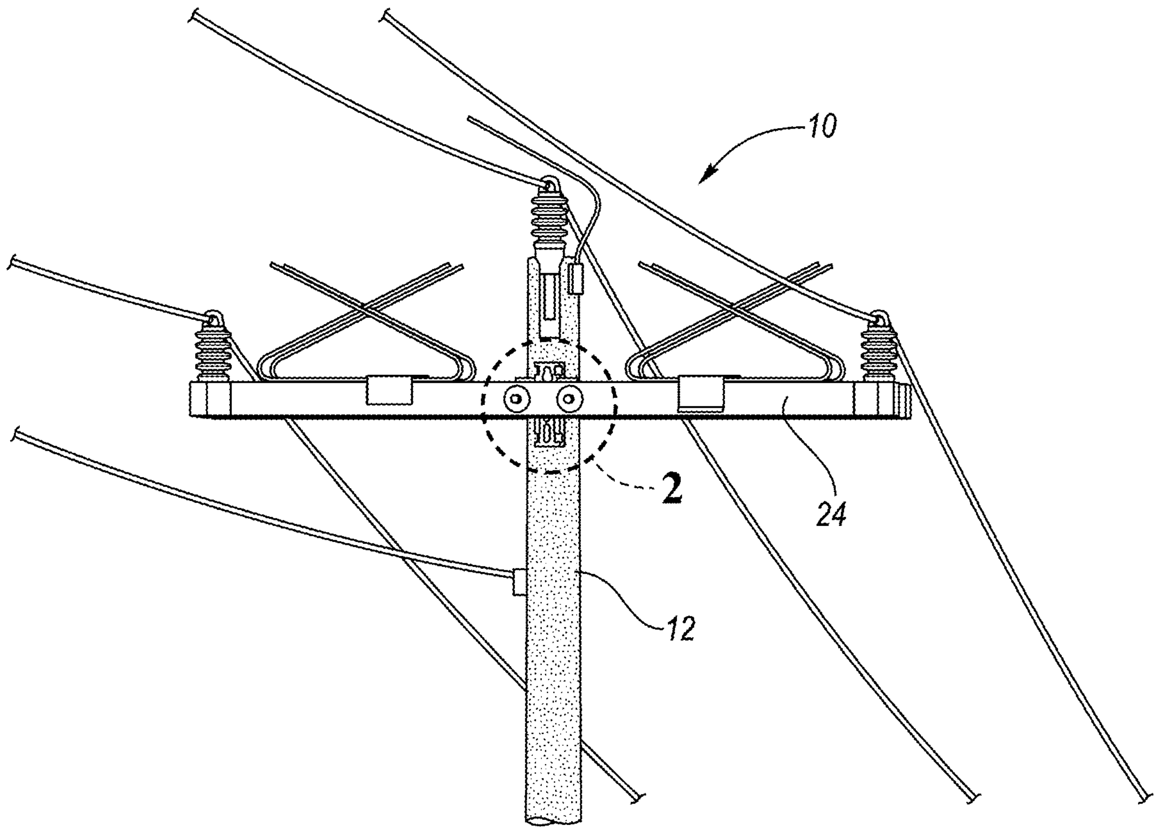
FIG. 1 is an environmental view of a utility pole system including a tangent base according to one aspect of the present disclosure.

FIG. 1 illustrates an example of a utility system 10 having a utility pole 12 and that utilizes a hardware attachments assembly 20 of the present disclosure.

Figure 2:
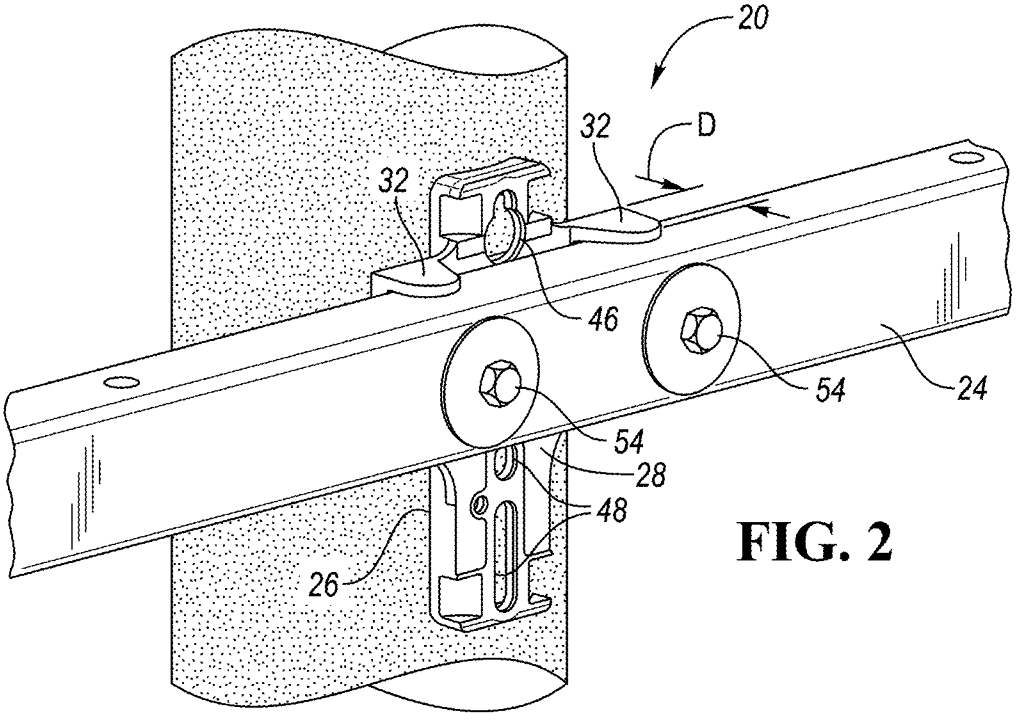
FIG. 2 is a perspective view of a utility hardware attachment assembly of FIG. 1 showing the tangent base and crossarm in more detail, according to one embodiment of the present disclosure.

FIG. 2 illustrates the hardware attachments assembly 20 in more detail. The hardware attachment assembly for utility poles 12 includes a tangent base 22 for mounting on the utility pole 12, and a crossarm 24 secured to the tangent base 22.

The tangent base 22 has a base body defined by a rear-mounting surface 26 for mounting to the utility pole 12. A front face 28 is opposite the rear-mounting surface 26. A channel 30 for receiving the crossarm 24 is formed by projections 32 extending forward from the front face 28. The channel 30 is sized to allow the crossarm is secured to the base body. An inner surface 34 of each of the projections 32 is a generally planar reaction surface. The inner surfaces 34 of the channel 30 abut the crossarm in reaction to asymmetric loading on the crossarm.

The crossarm 24 may experience asymmetric loading due to the weight of equipment mounted on the crossarm and compounded by environmental conditions such as wind, or buildup of ice or snow or even accidental contact from trees or equipment, for example. The integrated projections 32 improve the asymmetrical load capacity of the tangent base 22 over traditional mounting bases. For example, the tangent base 22 may more than double the asymmetric load capacity, as well as increasing the overall load capacity with minimal additional material or weight of the base. In one example, the tangent base 22 of the present application increased the maximum capacity from 15,000 lbs to 20,000 lbs, and increased the asymmetric loading capacity from 114,000 in-lbs to 230,000 in-lbs. Depending on load requirements, this increased load capacity of the tangent base 22 may also reduce the need for additional bracing.

As shown in FIG. 2, the crossarm 24 may be a box beam with a hollow cross section. The crossarm 24 may be formed of fiberglass. However, any suitable crossarm design or materials may be used. As illustrated in FIGS. 1-2, the crossarm 24 may extend from both lateral sides of the tangent base 22. The crossarm 24 may also be an alley arm that extends from one side of the tangent base 22.

Each of the projections 32 extends forward a projection depth dimension D being at least half a crossarm depth. For example, the crossarm 24 may have a depth of approximately four to six inches. The projections 32 may have a depth dimension D being approximately two to three inches.

Figure 3:
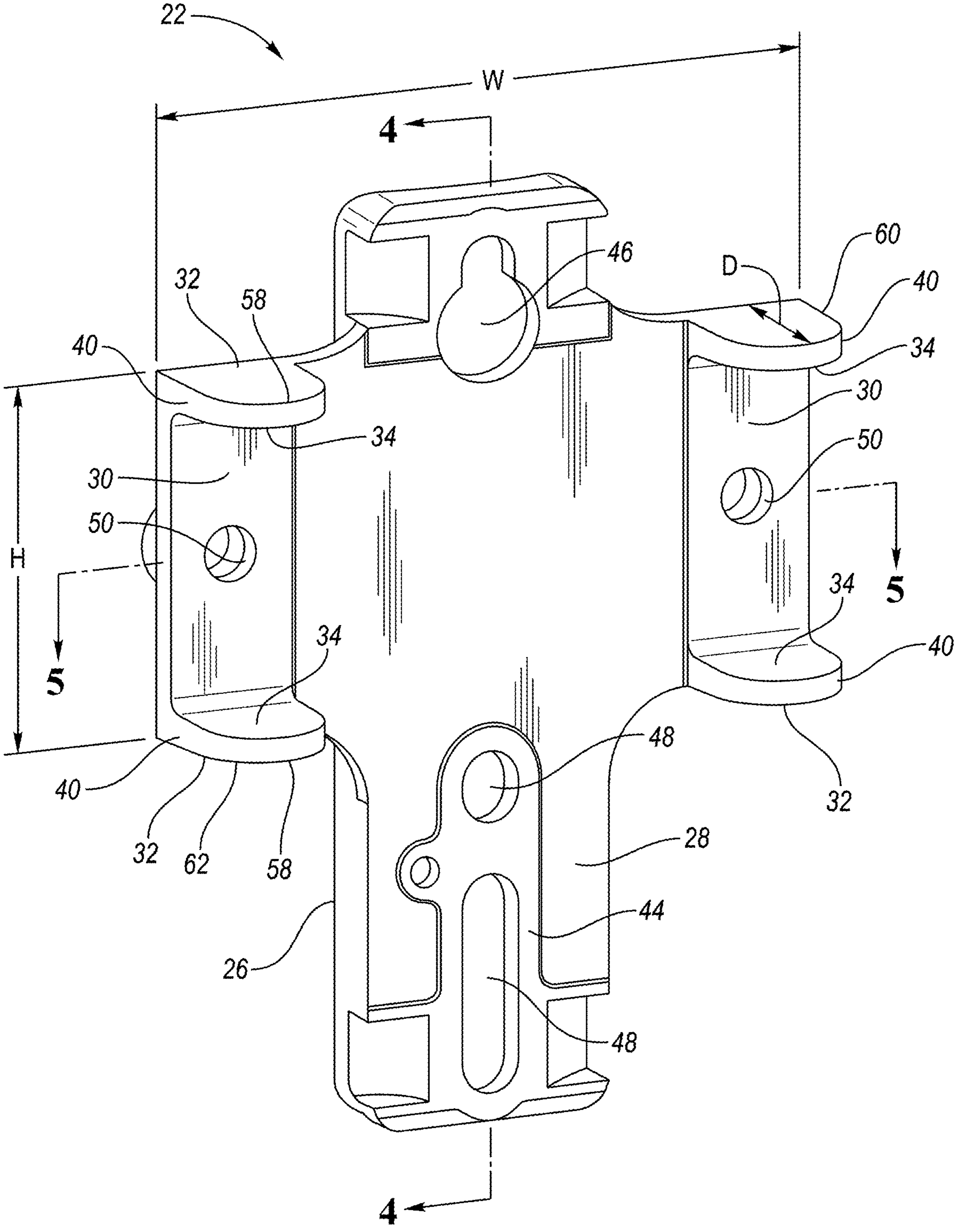
FIG. 3 is a perspective view of the tangent base in FIG. 2 in more detail, according to one embodiment of the present disclosure.
Figure 5:
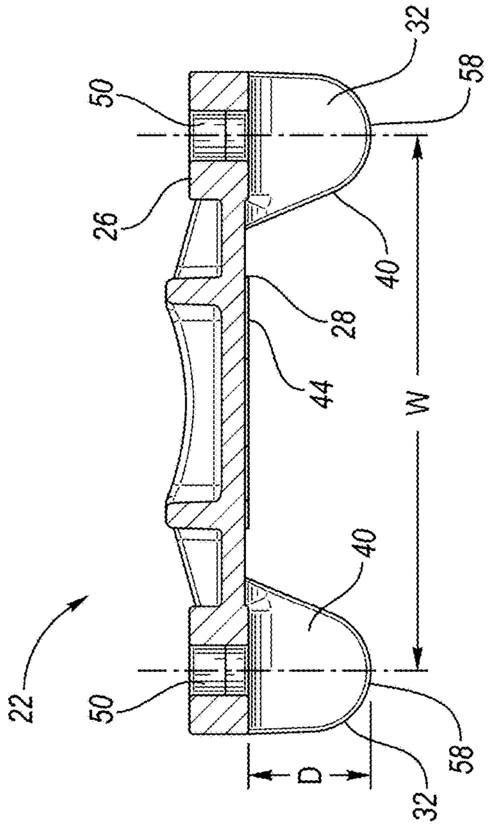
FIG. 5 is a cross-section through line 5-5 of FIG. 3, according to one embodiment of the present disclosure.
Figure 4:
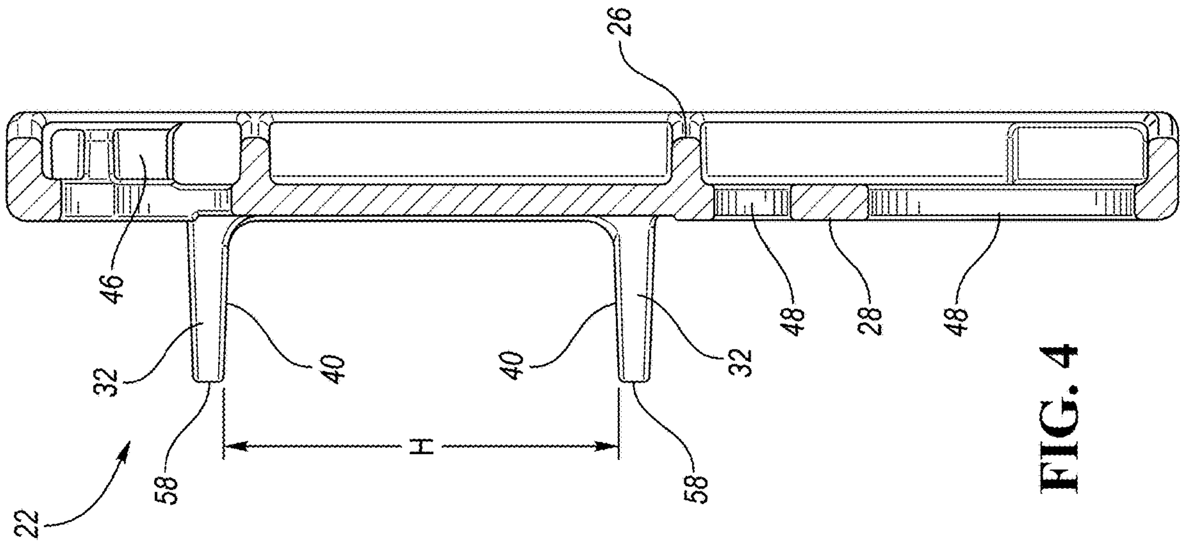
FIG. 4 is a cross-section through line 4-4 of FIG. 3, according to one embodiment of the present disclosure.

As shown in more detail in FIGS. 3-5, the projections 32 may include at least one pair of tabs 40 spaced apart in a height direction. The tabs 40 are spaced apart by at least a height dimension H of the crossarm 24. The dimensions are shown in detail in the cross-section views in FIGS. 4-5.

In another embodiment, the tangent base 22 includes at least two pair of tabs 40. As shown, the two pair of tabs 40 include tabs 40 spaced apart in a width direction and located on the lateral side of the base body. The tangent base 22 may be generally symmetric about a central vertical axis extending in the height direction. Each pair of tabs 40 may be positioned adjacent a crossarm mounting apertures 50 that is positioned within the channel 30. The mounting apertures 50 and the two pair of tabs 40 may be spaced apart by a width distance W. The width distance W may be generally equal to standard mounting locations on the crossarm 24. For example, the tabs 40 and mounting apertures 50 may be be spaced apart by the width distance being 8.5 inches, or 10.0 inches, or other standard mounting location.

Openings 52 on the crossarm 24 may be aligned with mounting apertures 50 on the tangent base 22 and the crossarm 24 may be fixed to the tangent base 22 with the fastener 54. The fastener 54 may be a screw, bolt, pin, or other suitable fastener. When the fastener is threaded, the crossarm mounting aperture 50 may include corresponding mating threads. Compared to prior designs, the fasteners may be minimized and may be lighter duty since the tabs 40 are helping counteract the loads. Therefore, the tabs 40 may allow for additional cost and material savings in the fasteners. The channel 30 also helps align the mounting apertures 50 with the crossarm openings 52, making it easier and quicker to install the crossarm 24 to the tangent base 22, especially in the field when the tangent base 22 is already installed on a utility pole.

The tabs 40 are spaced apart by the width distance W that is generally equal to a central mounting portion 44 of the tangent base 22. The central mounting portion 44 of the tangent base 22 includes a top keyhole 46 as well as a lower fastener through-holes 48 for mounting to a utility pole. As illustrated, the tabs 40 may be spaced apart by a width dimension W that is at least twice the depth dimension D of the tab 40. The tabs 40 may also be spaced apart any suitable width distance W may be distance suitable for counteracting asymmetric loads.

Prior designs had a solid lip above or below the crossarm. In contrast, by providing a plurality of tabs 40 that are spaced apart, the tangent base 22 provides increased asymmetric loading capacity at critical locations while minimizing additional material and minimizing the weight of the tangent base 22. When the crossarm 24 experiences an asymmetric load, only one of the tabs 40 in each pair abuts the crossarm 24. For example, one upper tab 60 and an opposite lower tab 62 may provide enough reaction surface to counteract the asymmetric load.

Other prior product designs that tried to address asymmetric loading required multiple components bolted together. Instead, the tangent base 22 of the present disclosure can be formed as one piece with the projections 32 integrally cast with the tangent base body. For example, the tangent base 22 may be cast of an aluminum alloy.

The tabs 40 have a distal end 58 that is curved and may have a constant radius. The curved distal end 58 may minimize stress points during asymmetric loading. The curved distal end may also minimize the required material and minimize weight of the tabs 40.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tangent base for a crossarm, the tangent base comprising:

a base body comprising:

a rear-mounting surface for mounting to a utility pole;

a front face opposite the rear-mounting surface; and a plurality of projections extending forward from the front face, the plurality of projections forming a channel sized for receiving the crossarm; and a plurality of crossarm mounting apertures extending through from the front face to the rear-mounting surface for securing the crossarm to the tangent base, wherein the crossarm mounting apertures are positioned within the channel.

2. The tangent base of claim 1, wherein an inner surface of each of the projections defining the channel is generally planar to abut the crossarm.

3. The tangent base of claim 1, wherein each of the projections extends forward a projection depth dimension being at least half a crossarm depth.

4. The tangent base of claim 3, wherein the plurality of projections comprise at least one pair of tabs having an upper tab and lower tab spaced apart in a height direction by at least a height dimension of the crossarm.

5. The tangent base of claim 4, wherein the at least one pair of tabs comprises two pair of tabs, wherein the two pair of tabs are spaced apart in a width direction.

6. The tangent base of claim 5, wherein the two pair of tabs are spaced apart in the width direction by at least twice the depth dimension of the projection.

7. The tangent base of claim 4, wherein the at least one pair of tabs comprise a first pair of tabs and a second pair of tabs, wherein the plurality of crossarm mounting apertures comprise a first fastener hole positioned adjacent the first pair of tabs and a second fastener hole positioned adjacent the second pair of tabs.

8. The tangent base of claim 5, wherein the base body is generally symmetric about a central vertical axis extending in a height direction.

9. The tangent base of claim 4, wherein the at least one pair of tabs have a distal end with a radius curvature.

10. The tangent base of claim 1, wherein the base body is cast of an aluminum alloy.

11. A utility hardware attachment assembly for utility poles, comprising:

a crossarm;

a tangent base comprising:

a rear-mounting surface for mounting to the utility pole;

a front face opposite the rear-mounting surface; and a plurality of projections extending forward from the front face, the plurality of projections forming a channel sized for receiving the crossarm; and at least two crossarm mounting apertures positioned within the channel and extending through from the front face to the rear-mounting surface, wherein the crossarm is secured to within the channel via the crossarm mounting apertures.

12. The utility hardware attachment assembly of claim 11, wherein the crossarm is formed of fiberglass.

13. The utility hardware attachment assembly of claim 11, wherein the crossarm extends from both lateral sides of the tangent base.

14. The utility hardware attachment assembly of claim 11, wherein the crossarm extends from one side of the tangent base.

15. The utility hardware attachment assembly of claim 11, wherein each of the projections extends forward a projection depth dimension being at least half a crossarm depth.

16. The utility hardware attachment assembly of claim 11, wherein the plurality of projections comprise at least one pair of tabs spaced apart in a height direction by at least a height dimension of the crossarm.

17. The utility hardware attachment assembly of claim 11, wherein the tabs have a distal end with a radius curvature.

18. A tangent base for a crossarm, the tangent base comprising:

a base body comprising:

a rear-mounting surface for mounting to the utility pole;

a front face opposite the rear-mounting surface; and a first and second pair of tabs extending forward from the front face, the first and second pair of tabs are spaced apart in a width direction forming a channel sized for receiving the crossarm, wherein an inner surface of each of the tabs is generally planar wherein each pair of tabs has an upper and lower tab spaced apart in a height direction by at least a height dimension of the crossarm, wherein the crossarm is secured to the base body within the channel.

19. The tangent base of claim 18, further comprising a plurality of crossarm mounting apertures extending through from the front face to the rear-mounting surface for securing the crossarm to the tangent base, wherein the crossarm mounting apertures are positioned within the channel.

20. The tangent base of claim 19, wherein the plurality of crossarm mounting apertures comprise a first fastener hole positioned adjacent the first pair of tabs and a second fastener hole positioned adjacent the second pair of tabs.

* * * * *